United States Patent
Sugiyama et al.

(10) Patent No.: US 7,054,512 B2
(45) Date of Patent: May 30, 2006

(54) OPTICAL WAVEGUIDE, OPTICAL DEVICE, AND METHOD OF MANUFACTURING OPTICAL WAVEGUIDE

(75) Inventors: Masaki Sugiyama, Kawasaki (JP); Tadao Nakazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/766,019

(22) Filed: Jan. 29, 2004

(65) Prior Publication Data

US 2004/0184755 A1 Sep. 23, 2004

(30) Foreign Application Priority Data

Mar. 20, 2003 (JP) ............... 2003-079116

(51) Int. Cl.
- G02F 1/295 (2006.01)
- G02B 6/26 (2006.01)
- G02B 6/42 (2006.01)
- G02B 6/10 (2006.01)
- C03B 37/23 (2006.01)
- C03B 37/22 (2006.01)

(52) U.S. Cl. ............... 385/9; 385/3; 385/29; 385/131; 65/385; 65/386

(58) Field of Classification Search ............ 385/27–29, 385/140, 1–3, 8, 9, 32, 39, 50; 65/385, 386
See application file for complete search history.

(56) References Cited

U.S. PATENT DOCUMENTS

| 4,116,530 | A  | * | 9/1978  | Bellavance et al. ......... 385/131 |
| 4,693,543 | A  |   | 9/1987  | Matsumura et al. |
| 4,818,063 | A  | * | 4/1989  | Takizawa ......................... 385/8 |
| 4,827,866 | A  | * | 5/1989  | Maunders ....................... 118/50 |
| 4,851,368 | A  | * | 7/1989  | Behfar-Rad et al. ........... 438/39 |
| 5,455,876 | A  |   | 10/1995 | Hopfer et al. |
| 5,524,165 | A  |   | 6/1996  | Labeye et al. .............. 385/129 |
| 5,872,883 | A  | * | 2/1999  | Ohba et al. .................. 385/129 |
| 5,991,475 | A  |   | 11/1999 | Nelson |
| 6,304,685 | B1 |   | 10/2001 | Burns ............................. 385/3 |
| 6,483,966 | B1 | * | 11/2002 | Bona et al. .................... 385/43 |
| 6,511,570 | B1 | * | 1/2003  | Matsui ......................... 156/245 |
| 6,579,068 | B1 | * | 6/2003  | Bridger et al. ................ 417/53 |
| 6,790,689 | B1 | * | 9/2004  | Behfar .......................... 438/22 |
| 6,873,636 | B1 | * | 3/2005  | Nakamura et al. ....... 372/45.01 |
| 2002/0048433 | A1 |   | 4/2002  | Wu et al. ...................... 385/49 |
| 2002/0146190 | A1 |   | 10/2002 | Doi et al. ...................... 385/14 |

(Continued)

FOREIGN PATENT DOCUMENTS

EP 0364214 B1 1/1995

(Continued)

OTHER PUBLICATIONS

Copy of European Patent Office Communication dated Oct. 4, 2005.

(Continued)

Primary Examiner—Brian Healy
Assistant Examiner—Charlie Peng
(74) Attorney, Agent, or Firm—Staas & Halsey LLP

(57) ABSTRACT

An optical waveguide is formed on a substrate and includes a curved ridge structure, a curved optical path, and a buffer layer. The curved ridge structure is formed on the substrate so as to have a curvature in a longitudinal direction of the curved ridge structure. The curved optical path is formed along the curved ridge structure. The buffer layer covers a side of the ridge structure and has a lower refractive index than a refractive index of the substrate.

6 Claims, 10 Drawing Sheets

U.S. PATENT DOCUMENTS

| | | |
|---|---|---|
| 2002/0159739 A1 | 10/2002 | Yang et al. |
| 2003/0044152 A1* | 3/2003 | Bazylenko .................. 385/129 |
| 2003/0128729 A1* | 7/2003 | Matsumura .................. 372/46 |
| 2003/0156327 A1* | 8/2003 | Terakawa et al. ........... 359/592 |
| 2004/0184704 A1* | 9/2004 | Bakir et al. .................. 385/14 |

FOREIGN PATENT DOCUMENTS

| | | |
|---|---|---|
| EP | 0570124 B1 | 1/1997 |
| EP | 0905 836 | 3/1999 |
| EP | 0905836 A2 | 3/1999 |
| EP | 0905836 A3 | 4/1999 |
| EP | 1 154 293 A2 | 11/2001 |
| JP | 60-15606 | 1/1985 |
| JP | 11-167032 | 6/1999 |
| JP | 2000-147289 | 5/2000 |
| WO | WO 02/35267 | 5/2002 |
| WO | WO 02/35267 A1 | 5/2002 |

OTHER PUBLICATIONS

Copy of European Patent Office Communication dated Sep. 21, 2005.

* cited by examiner

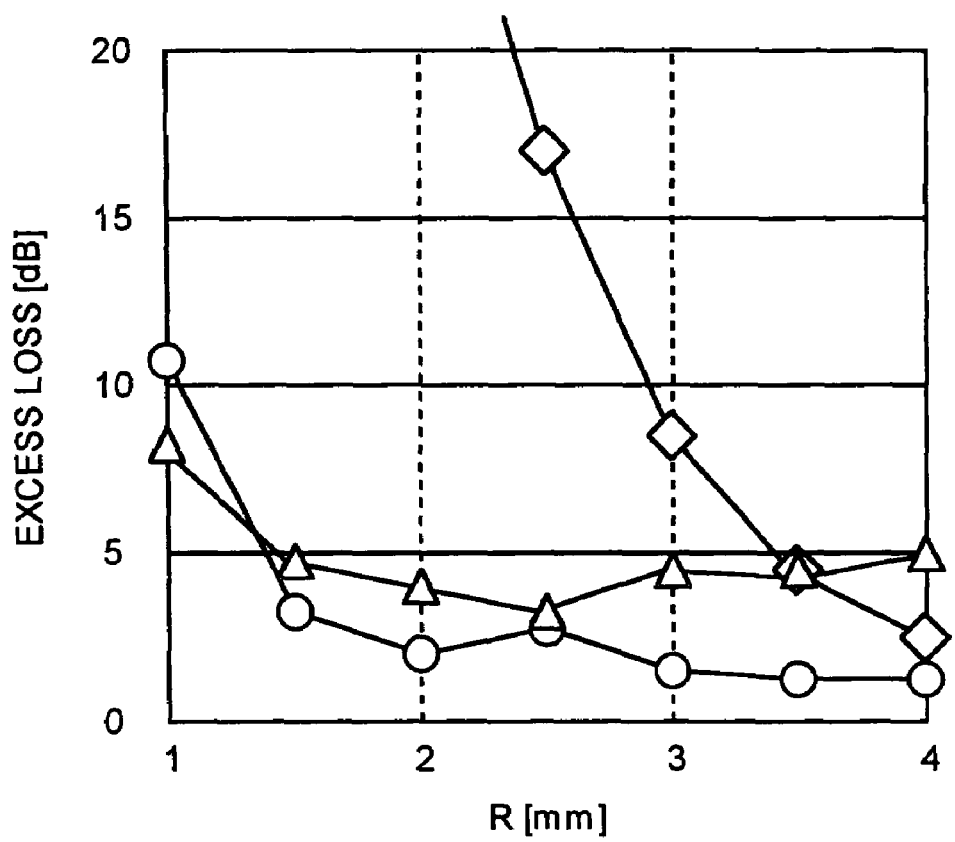

Ti PATTERN FORMATION

THERMAL DIFFUSION

ETCHING

BUFFER LAYER FORMATION

OPTICAL WAVEGUIDE, OPTICAL DEVICE, AND METHOD OF MANUFACTURING OPTICAL WAVEGUIDE

CROSS-REFERENCE TO RELATED APPLICATIONS

This application is based upon and claims the benefit of priority from the prior Japanese Patent Application No.2003-079116, filed on Mar. 20, 2003, the entire contents of which are incorporated herein by reference.

BACKGROUND OF THE INVENTION

1) Field of the Invention

The present invention relates to an optical waveguide that is used for optical communication. Particularly, the present invention relates to an optical waveguide of a diffusion type waveguide capable of reducing a curvature of a curved portion and capable of making an optical device small, an optical device that uses the optical waveguide, and a method of manufacturing the optical waveguide.

2) Description of the Related Art

An optical device formed with an optical waveguide is provided using an electrooptic crystal such as an LN substrate ($LiNbO_3$: lithium niobate), forming a metal film such as titanium (Ti) on a part of the crystal substrate, and thermally diffusing the metal film. To connect a plurality of optical devices each formed with the optical waveguide, a curved optical waveguide is formed on a part of the optical waveguide. Based on the provision of the curved optical waveguide, the direction of a straight optical waveguide can be turned. Therefore, it becomes possible to make the optical device small, and, particularly, make a size in its length direction small. An apparatus on which the optical waveguide is mounted can also be provided in compact.

When a curved waveguide is formed on a part of the optical waveguide, an optical loss (i.e., a radiation loss) that occurs at the curved waveguide portion becomes a problem. In order to suppress the loss at the curved waveguide portion, a technique is so far proposed to combine light that is radiated at the curved optical waveguide portion again on the optical waveguide, by providing a reflector on the external periphery of the curved optical waveguide (see Japanese Patent Application Laid-open No. H11-167032, for example).

One example of the optical device that is configured using the optical waveguide will be explained. FIG. 16 is a top plan view of an optical modulator that illustrates an example of the conventional optical device. This optical modulator 20 is a Mach-Zehnder interruption type optical modulator, and has a straight optical waveguide. A data line 22 that is supplied with an electronic signal such as DC is formed to have a predetermined length L0 in its longitudinal direction on a substrate 21. Both ends of the data line 22 are led out to one side of the substrate 21 respectively, and signal electrodes 22a and 22b are formed. A ground electrode 23 is formed on other partition of the substrate 21 excluding the data line 22. An optical waveguide 24 is disposed linearly along the data line 22, and two optical waveguides 24 are disposed in parallel between branch portions 24a and 24b.

When the electronic signal is supplied to the data line 22 and also when the optical signal is supplied to the two optical waveguides 24, a phase difference due to mutual interference can be generated between the two optical waveguides 24 in a state that a speed of a progressive wave of the electronic signal (microwave) that is supplied to the data line 22 and a speed of an optical wave that flows through the two optical waveguides 24 are matched. In order to generate the phase difference, a predetermined work length (corresponding to the length L0) is necessary as a length of the parallel two optical waveguides 24. A few centimeters are necessary for the length of L0.

However, even when the conventional technique is used, the curvature of the curved optical waveguide cannot be set small. For example, when the curvature of the curved optical waveguide is set small to a few millimeters, the recombining of the light becomes insufficient, and the optical loss increases remarkably. When the curvature of the curved optical waveguide cannot be set small, the total optical waveguide cannot be made small, which makes it impossible to make small the optical device that is formed with the optical waveguide or to integrate the optical device. For example, even when a curved optical waveguide is formed on a part of the optical waveguide of the optical device as shown in FIG. 16, the optical device cannot be made compact.

The present invention has been achieved in order to solve the above problems, and has an object of providing a compact optical waveguide, a compact optical device, and a method of manufacturing the optical waveguide capable of suppressing the optical loss.

SUMMARY OF THE INVENTION

It is an object of the present invention to at least solve the problems in the conventional technology.

An optical waveguide that is formed on a substrate according to one aspect of the present invention includes a curved ridge structure that is formed on the substrate so as to have a curvature in a longitudinal direction of the curved ridge structure; a curved optical path that is formed along the curved ridge structure; and a buffer layer that covers a side of the curved ridge structure and that has a lower refractive index than a refractive index of the substrate.

An optical device for performing phase modulation according to another aspect of the present invention includes an optical waveguide and a signal electrode. The optical waveguide includes a curved ridge structure that is formed on a substrate so as to have a curvature in a longitudinal direction of the curved ridge structure; a curved optical path that is formed in and along the curved ridge structure; and a buffer layer that covers a side of the ridge structure and that has a lower refractive index than a refractive index of the substrate. The signal electrode is disposed on and along the optical waveguide.

A method of manufacturing an optical waveguide according to still another aspect of the present invention includes forming a pattern of titanium on a substrate, the pattern including a curved pattern for forming a curved optical path; thermally diffusing the pattern at a high temperature; forming a ridge structure by etching the substrate positioned at a side of the curved pattern, along a shape of the curved pattern; and forming a buffer layer on a side of the ridge structure, the buffer layer being made of a material that has a lower refractive index than a refractive index of the substrate.

A method of manufacturing an optical waveguide according to still another aspect of the present invention includes forming a proton exchange pattern on a substrate by proton exchange, the pattern including a curved pattern for forming a curved optical path; forming a ridge structure by etching the substrate positioned at a side of the curved pattern, along a shape of the curved pattern; and forming a buffer layer on a side of the ridge structure, the buffer layer being made of a material that has a lower refractive index than a refractive index of the substrate.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIG. 3 is a graph indicating the optical loss of the optical waveguide;

DETAILED DESCRIPTION

Exemplary embodiments of an optical waveguide, an optical device using the optical waveguide, and a method of manufacturing the optical waveguide according to the present invention will be explained in detail below with reference to the accompanying drawings.

Figure 1:
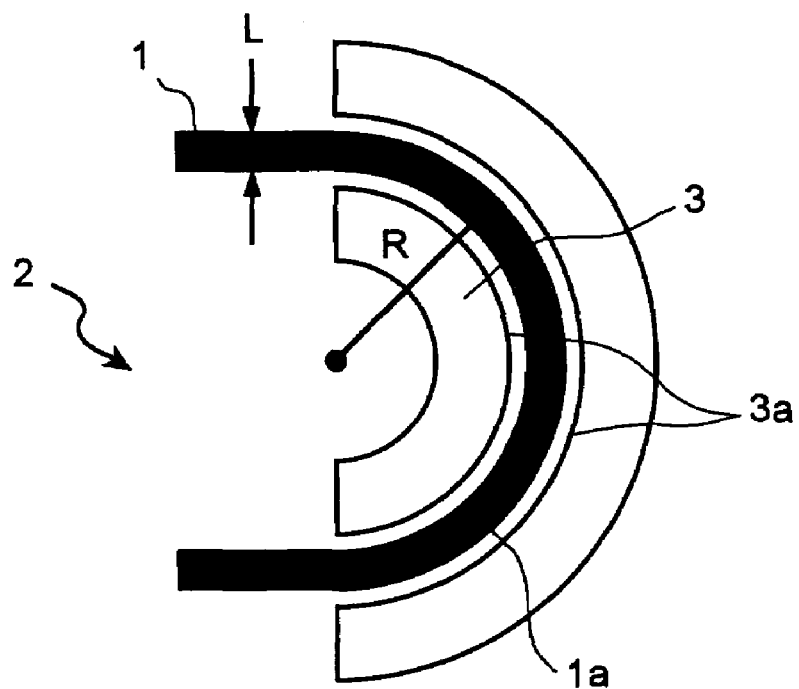
FIG. 1 is a top plan view of an optical waveguide according to a first embodiment of the present invention.
Figure 2:
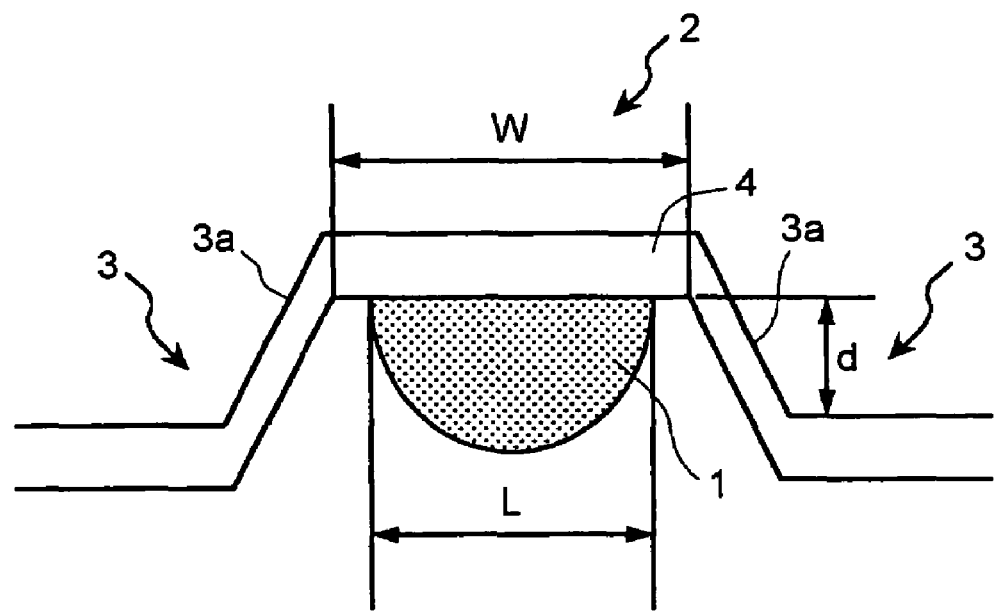
FIG. 2 is a cross-sectional view of the optical waveguide shown in FIG. 1.

An optical waveguide according to a first embodiment of the present invention will be explained. FIG. 1 is a top plan view of the optical waveguide according to the first embodiment. FIG. 2 is a cross-sectional view of the optical waveguide shown in FIG. 1. FIG. 1 mainly illustrates a curved portion as a key portion of the optical waveguide. An optical waveguide 1 is a titanium diffusion lithium niobate (Ti—LiNbO$_3$) diffusion waveguide. A curved portion 1a shown in the drawing has an arc shape with a central angle of 180 degrees. A pattern width L of the optical waveguide 1 is set to 5 to 9 micrometers to have a small mode field of light. An optical wave that propagates through the optical waveguide 1 is generally a single mode (hereinafter, "SM") light, but the optical propagation mode of the optical waveguide 1 according to this invention is not limited to the SM.

As shown in FIG. 2, a substrate 2 is dug out to form a ridge structure 3 at both sides of at least the curved portion 1a of the optical waveguide 1. The substrate 2 is etched to form the ridge structure 3. The power of the light that propagates through the optical waveguide 1 becomes a maximum at a position of about 3 micrometers from the surface. Therefore, a depth d of the ridge structure 3 that is formed by etching is set to equal to or larger than 3 micrometers. In the ridge structure 3, air (refractive index 1) corresponds to a cladding. A difference between a refractive index of the substrate 2 (refractive index 2.2) in a lateral direction with respect to a light proceeding direction and the refractive index of air becomes large, and a curvature of the curved portion 1a becomes small. Even when a curvature of the curved portion 1a becomes small, a radiation loss can be suppressed.

However, the ridge structure 3 that is formed by digging down the substrate 2 has a rough surface and not smooth on the side surface 3a. When the side surface 3a facing the curved portion 1a of the optical waveguide 1 is rough, an optical loss occurs at the curved portion 1a. In other words, when the side surface 3a is rough, a scattering loss becomes large among the optical loss. In order to prevent the scattering loss, a film-shaped buffer layer 4 is formed on the surface of the side surface 3a of the ridge structure 3. For the buffer layer 4, a material having a smaller refractive index than that of the substrate 2 can be used such as silicon oxide (SiO$_2$) and titanium oxide (TiO$_2$).

In order to confine the optical field with the side surface 3a of the ridge structure 3, the width W of the ridge structure 3 is preferably equal to or smaller than the width L of the optical waveguide 1 plus 6 micrometers (i.e., both sides are equal to or less than 3 micrometers from the center of the optical waveguide 1 respectively).

FIG. 3 is a graph indicating the optical loss of the optical waveguide according to the present invention. In the drawing, the abscissa represents a curvature (a radius) R of the curved portion 1a of the optical waveguide 1, and the ordinate represents the optical loss (excessive loss). As shown in the drawing, in the configuration having the ridge structure 3 and the buffer layer 4 provided like in the optical waveguide 1 according to the present invention (the circle symbol in the drawing), the optical loss can be suppressed even when the curvature R is set small to 4 millimeters or below. On the other hand, in the configuration having the ridge structure 3 and the buffer layer 4 not formed like in the conventional optical waveguide (the square symbol in the drawing), the optical loss is large in the total range of the curvature R equal to or smaller than 4 millimeters. In the configuration having only the ridge structure 3 provided without providing the buffer layer 4 (the triangle symbol in the drawing), the optical loss can be suppressed as compared with the conventional method.

Figure 4A:
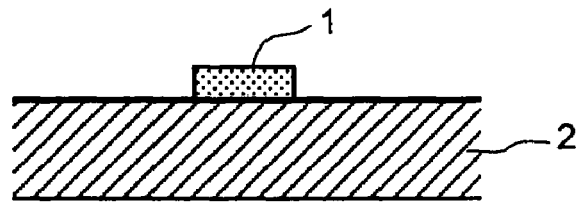
FIGS. 4A to 4D are illustrates for process of manufacturing the optical waveguide.

FIGS. 4A to 4D are illustrates for process of manufacturing the optical waveguide according to the present invention. In the process of manufacturing the optical waveguide 1, a Ti pattern is-first formed as shown in FIG. 4A. After Ti is deposited on the whole surface of the LN substrate 2, a resist pattern is formed along the layout of the optical waveguide 1 including the ridge structure 1a. Thereafter, the optical waveguide 1 is formed by etching.

Figure 4B:
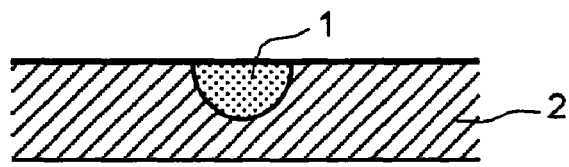

A thermal diffusion is then carried out as shown in FIG. 4B. By thermally diffusing the optical waveguide 1 at a high temperature, the optical waveguide 1 of Ti is thermally diffused to have a cross section in approximately a semicircle shape inside the substrate 2. In this state, the optical waveguide 1 has a highest refractive index at approximately the center of the circle, and can guide the wave in confinement. In this process, the optical waveguide 1 can be formed by proton exchange in benzoic acid, in place of carrying out the thermal diffusion.

Figure 4C:
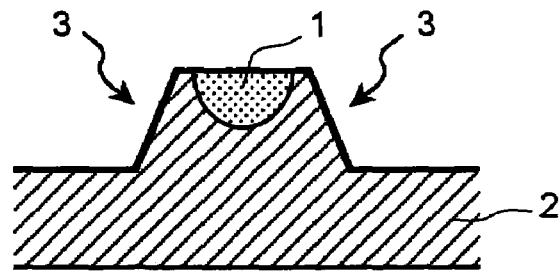

Thereafter, the etching is carried out as shown in FIG. 4C. As described above, the ridge structure 3 is formed by digging out the substrate 2 positioned at least at the curved portion 1a of the optical waveguide 1 by etching. This etching process may be a reactive ion etching (RIE) or the like. In this etching, the width W and the height d required for the ridge structure 3 are satisfied based on the pattern width L (refer to FIG. 2) of the optical waveguide 1.

Figure 4D:
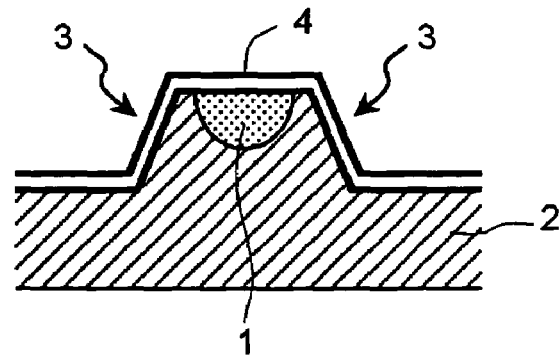

Thereafter, a buffer layer is formed as shown in FIG. 4D. The buffer layer 4 is formed to cover the side surface 3a of the ridge structure 3 by sputtering or the like. In the above steps, the optical waveguide 1 can be formed in the state that the ridge structure 3 and the buffer layer 4 are formed on the substrate 2.

In the above explanation, while the ridge structure 3 and the buffer layer 4 are provided on only the ridge structure 1a of the optical waveguide 1, the ridge structure 3 and the buffer layer 4 may also be provided on a straight line portion that continues from the curved portion 1a. Further, while the optical waveguide 1 shown in FIG. 1 has the ridge structure 1a configured in the arc shape having a central angle of 180 degrees, the curve angle of the curved portion 1a is not limited to this configuration. For example, an output of the optical wave can be directed to a different direction from the input direction at an angle of 90 degrees or above.

Figure 5:
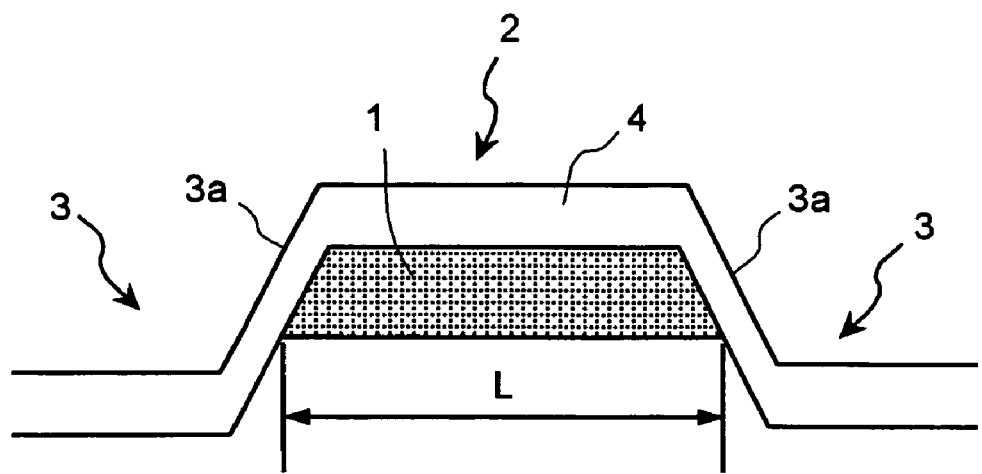
FIG. 5 is a cross-sectional view of a modification of the optical waveguide.

Modifications of the optical waveguide 1 will be explained below. FIG. 5 is a cross-sectional view of a modification of the optical waveguide. In the example shown in FIG. 5, the width L of the optical waveguide 1 coincides with the width of the ridge structure 3. This optical waveguide 1 is formed by expanding the width of the resist pattern to be larger than the width W of the ridge structure 3 at the time of forming the Ti pattern of the optical waveguide 1, and then executing a diffusion at the diffusion time so that the diffusion depth is approximately constant in a normal direction of the substrate. The optical waveguide 1 formed in this way has a flat surface as compared with the cross-sectional shape shown in FIG. 2.

Figure 6:
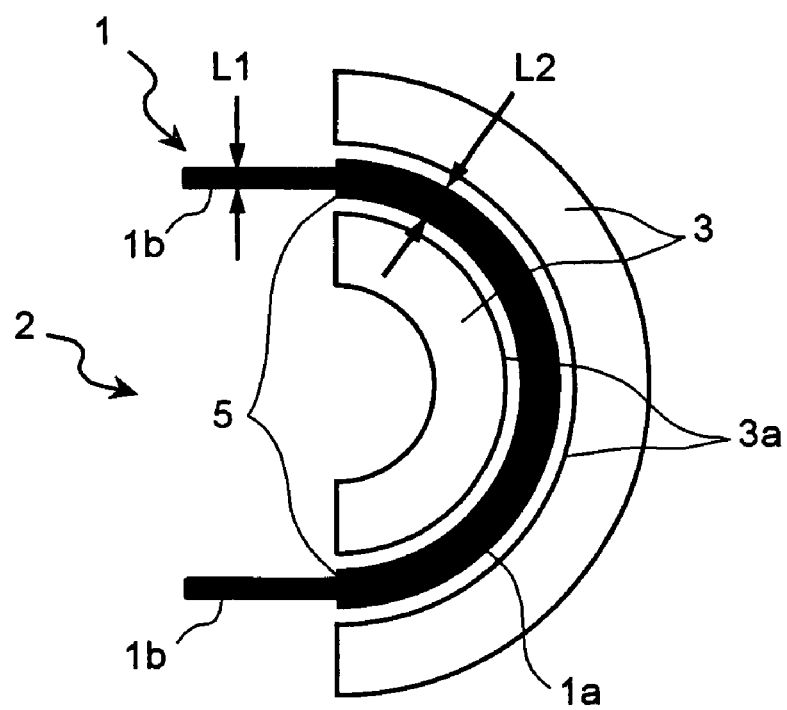
FIG. 6 is a top plan view of another modification of the optical waveguide.
Figure 7:
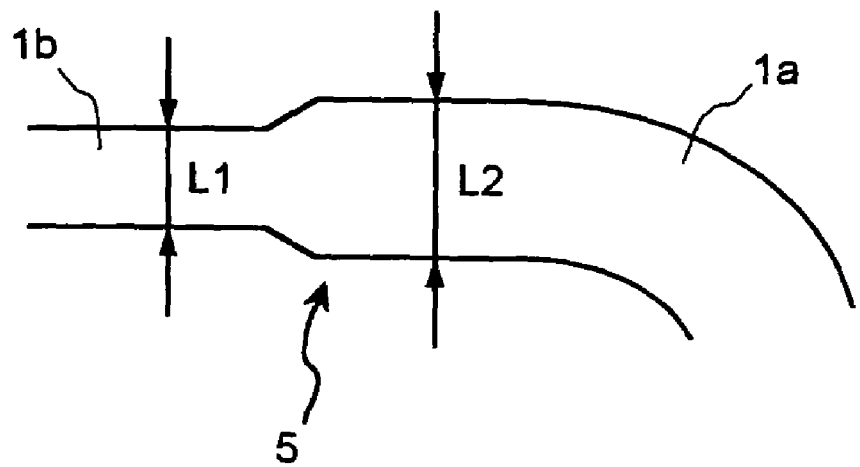
FIG. 7 is a partial top plan view of a coupler of the optical waveguide.

FIG. 6 is a top plan view of another modification of the optical waveguide. At the time of configuring the optical waveguide 1 by connecting the curved portion 1a with the straight line portion 1b, a pattern width L1 of the straight line portion 1b and a pattern width L2 of the ridge structure 1a may be differentiated in order to minimize the optical loss at respective positions. In this case, a coupler 5 is provided at a coupling portion between the straight line portion 1b and the curved portion 1a. The coupler 5 shown in FIG. 6 is formed to have a stage. FIG. 7 is a partial top plan view of another example of a configuration of the transformation section. As shown in FIG. 7, the coupler 5 may be formed in tapered shape. When the coupler 5 is an optical path whose width gradually changes from a width of the straight line portion 1b to a width of the curved portion 1a, the coupling loss at the coupler 5 can be reduced.

Figure 8:
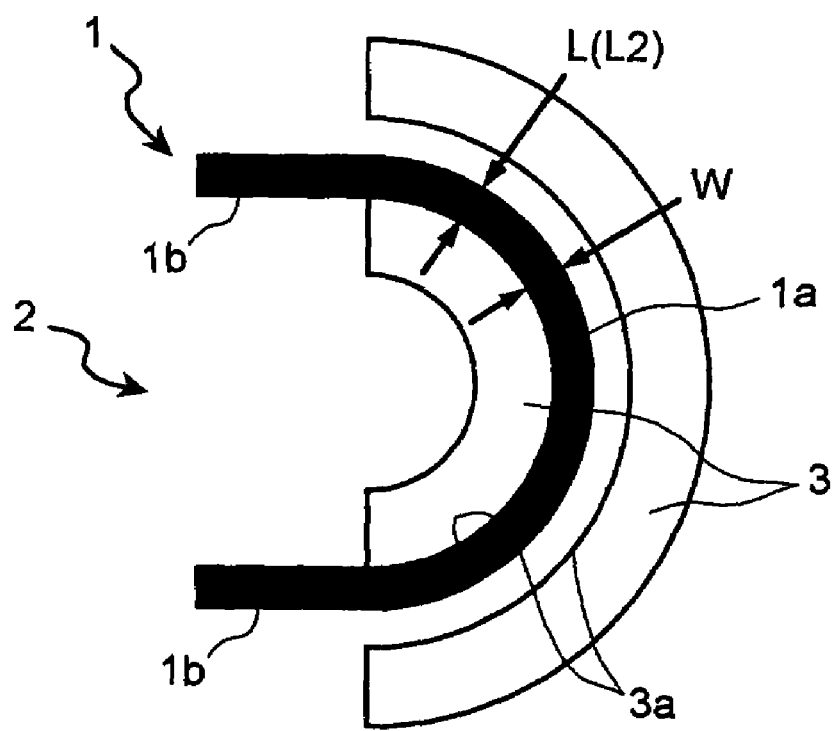
FIG. 8 is a top plan view of still another modification of the optical waveguide.

FIG. 8 is a top plan view of still another modification of the optical waveguide. In the configuration shown in FIG. 8, the position of the curved portion 1a of the optical waveguide 1 is shifted to the inside relative to the ridge structure 3. The position of the curved portion 1a is not limited to pass through the center of the ridge structure 3 as shown in FIG. 1. In the example shown in FIG. 8, the curved portion 1a having the pattern width L is shifted toward the inside from the center of the ridge structure 3 having the width W. In this state, the internal periphery of the curved portion 1a is close to or is connected to the side surface 3a of the inside ridge structure 3. On the other hand, the external periphery of the curved portion 1a is separated from the side surface 3a of the outside ridge structure 3 by a predetermined distance. As explained above, the curved portion 1a may be shifted to the outside, in addition to a configuration of shifting the curved portion 1a to the inside of the ridge structure 3.

In this case, the shift is carried out by a predetermined amount to a direction of reducing the radiation loss. Particularly, as shown in FIG. 8, the radiation loss can be suppressed by setting a distance between the curved portion 1a and the side surface 3a of the ridge structure 3 that is disposed at the external peripheral side of the curved portion 1a. In general, optical losses that are important in the optical waveguide are the radiation loss and the scattering loss. In the above configuration, when the width W of the ridge structure 3 is made smaller, the influence of the radiation loss can be decreased, but the influence of the scattering loss increases. On the other hand, when the width W of the ridge structure 3 is made larger, the influence of the scattering loss can be decreased, but the influence of the radiation loss increases. The scattering loss occurs because of the roughness of the side surface 3a of the ridge structure 3 as described above. Based on this condition, the shift amount capable of suppressing the radiation loss without having the influence of the scattering loss can be set.

Figure 9:
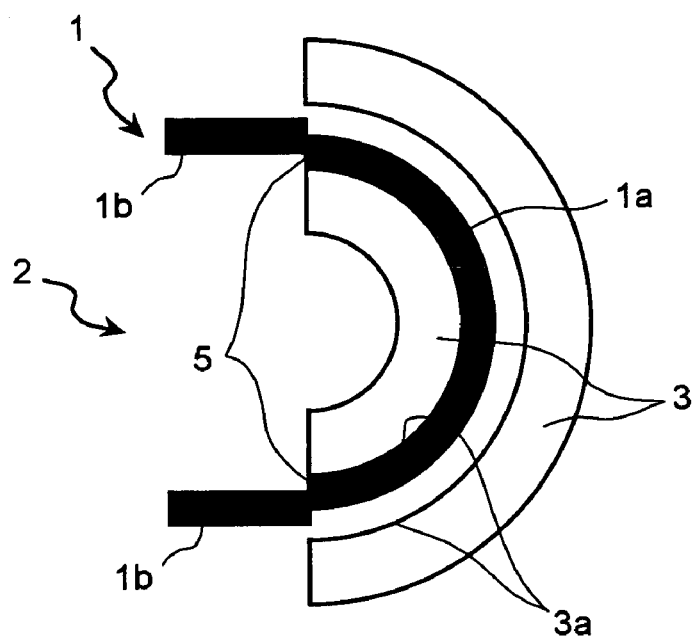
FIG. 9 is a top plan view of still another modification of the optical waveguide.

FIG. 9 is a top plan view of still another modification of the optical waveguide. In the configuration shown in FIG. 9, the center position of the curved portion 1a and the center position of the straight line portion 1b are shifted at the portion of the coupler 5. In general, at the coupling portion between the straight line portion and the curved portion of the optical waveguide and at the coupling portion between the curved portions, the coupling loss (offset) occurs due to the difference between the optical propagation state (field) of the straight line portion and the optical field of the curved portion. In order to suppress the coupling loss, a configuration of shifting the mutual coupling by a predetermined amount is employed (for example, see Japanese Patent Application Laid-open No. H11-167032). Based on the provision of the shift of center, the coupling loss can be suppressed by making the distributions of the field (or magnetic field) of the respective propagation light approximately equal. When the center position of the curved portion 1a and the center position of the straight line portion 1b are shifted at the position of the coupler 5 like in the configuration as shown in FIG. 9, the coupling loss and the radiation loss of the curved portion 1a can be suppressed. FIG. 9 also illustrates the configuration of shifting the center position of the curved portion 1a relative to the center position of the ridge structure 3 (refer to FIG. 8). In this way, the scattering loss and the radiation loss can be suppressed more.

Figure 10:
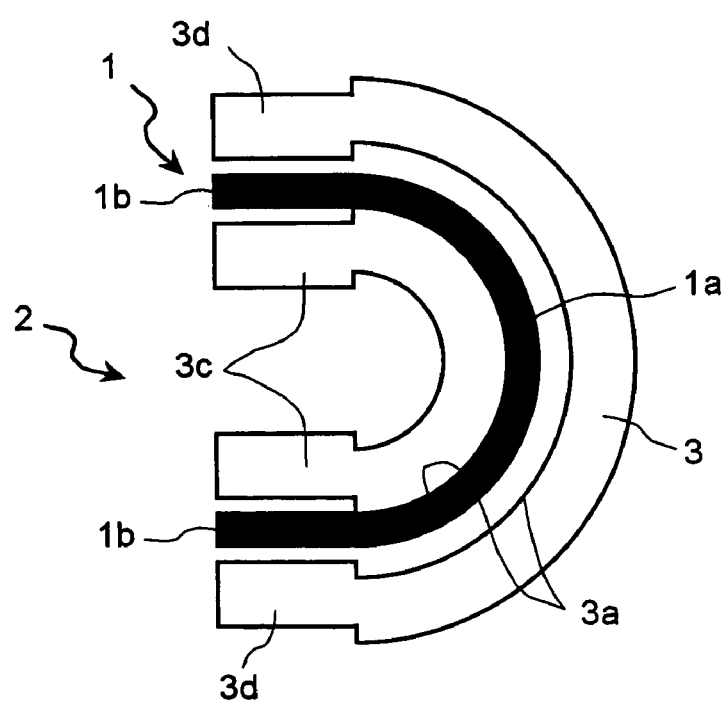
FIG. 10 is a top plan view of still another modification of the optical waveguide.

FIG. 10 is a top plan view of still another modification of the optical waveguide. The configuration shown in FIG. 10 is a modification of the ridge structure 3. In the configuration shown in FIG. 10, a stage having a predetermined shift amount is formed in the ridge structure 3 at the coupling portion between the curved portion 1a and the straight line portion 1b of the optical waveguide 1. As shown in FIG. 10, the width of the curved portion 1a and that of the straight line portion 1b that constitute the optical waveguide 1 are constant. FIG. 10 also illustrates the configuration of shifting the center position of the curved portion 1a relative to the center position of the ridge structure 3, in a similar manner to that shown in FIG. 9. Further, the center position of the straight line portion 1b of the optical waveguide 1 coincides with the center position of the ridge structures 3c and 3d respectively that are provided at both sides of the straight line portion 1b. With this arrangement, a stage having a predetermined shift amount is formed at the coupling portion between the ridge structure 3 of the curved portion 1a and the ridge structures 3c and 3d of the straight line portion 1b of the optical waveguide 1. As explained above, the ridge structure 3 provided at the side of the optical waveguide 1 can be formed individually by matching the optimum layout state at the curved portion 1a with the optimum layout state at the straight line portion 1b.

Figure 11:
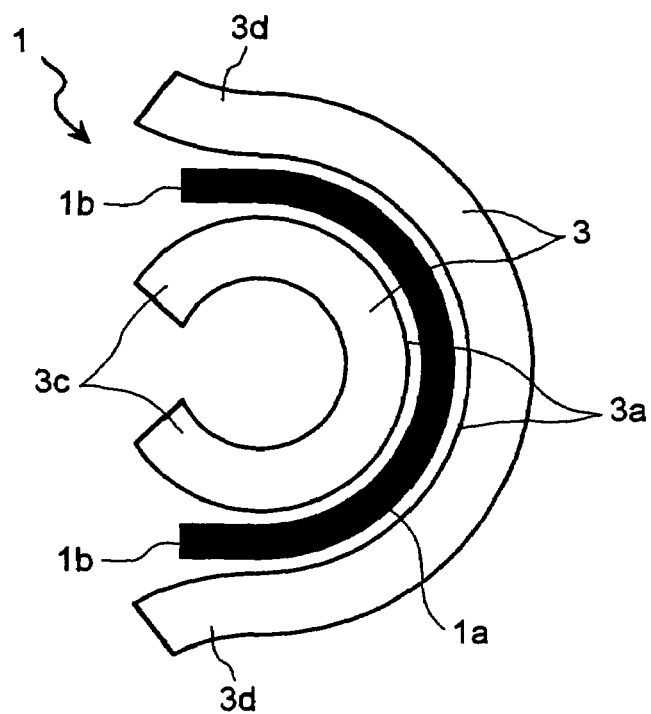
FIG. 11 is a top plan view of still another modification of the optical waveguide.

FIG. 11 is a top plan view of still another modification of the optical waveguide. The configuration shown in FIG. 11 is a modification of the ridge structure 3. When the ridge structure 3 is formed at only the curved portion 1a of the optical waveguide 1 as shown in FIG. 1, a coupling loss may occur at a starting point of the ridge, that is, at the coupling portion between the straight line portion 1b and the curved portion 1a of the optical waveguide 1 (i.e., the position of the coupler 5). In this case, as shown in the drawing, the ridge structure 3 is not provided at only the curved portion 1a but is also stretched as extension portions 3c and 3d to a direction of the straight line portion 1b by a predetermined amount. The extension portions 3c and 3d are formed to gradually leave the straight line portion 1b as they leave the position of the coupling portion. In the example shown in FIG. 11, the extension portion 3c positioned at the inside of the optical waveguide 1 is formed toward the inside at same curvature as that of the ridge structure 3. The extension portion 3d positioned at the outside of the optical waveguide 1 has the same curvature as that of the extension 3c, and is formed toward the outside. As explained above, when the extension portions 3c and 3d are formed, the occurrence of the coupling loss at the coupling portion (i.e., the coupling portion between the straight line portion 1b and the curved portion 1a) can be suppressed, even when the ridge structure 3 is partly provided on the curved portion 1a.

Figure 12:
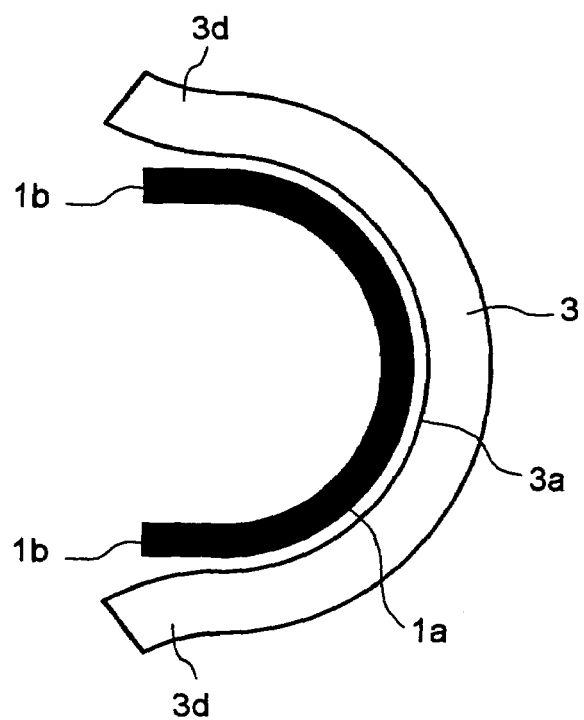
FIG. 12 is a top plan view of still another modification of the optical waveguide.

FIG. 12 is a top plan view of still another modification of the optical waveguide. In the configuration shown in FIG. 12, out of the extension portions explained with reference to FIG. 11, only the external extension portion 3d is provided. As shown in FIG. 12, when the extension portion 3d is provided on the ridge structure 3 that is positioned at the outside of the optical waveguide 1, the coupling loss can be minimized.

In a second embodiment, an optical device that uses the optical waveguide 1 explained in the first embodiment will be explained. The optical device that uses the optical waveguide 1 includes an optical switch and an optical modulator.

Figure 13:
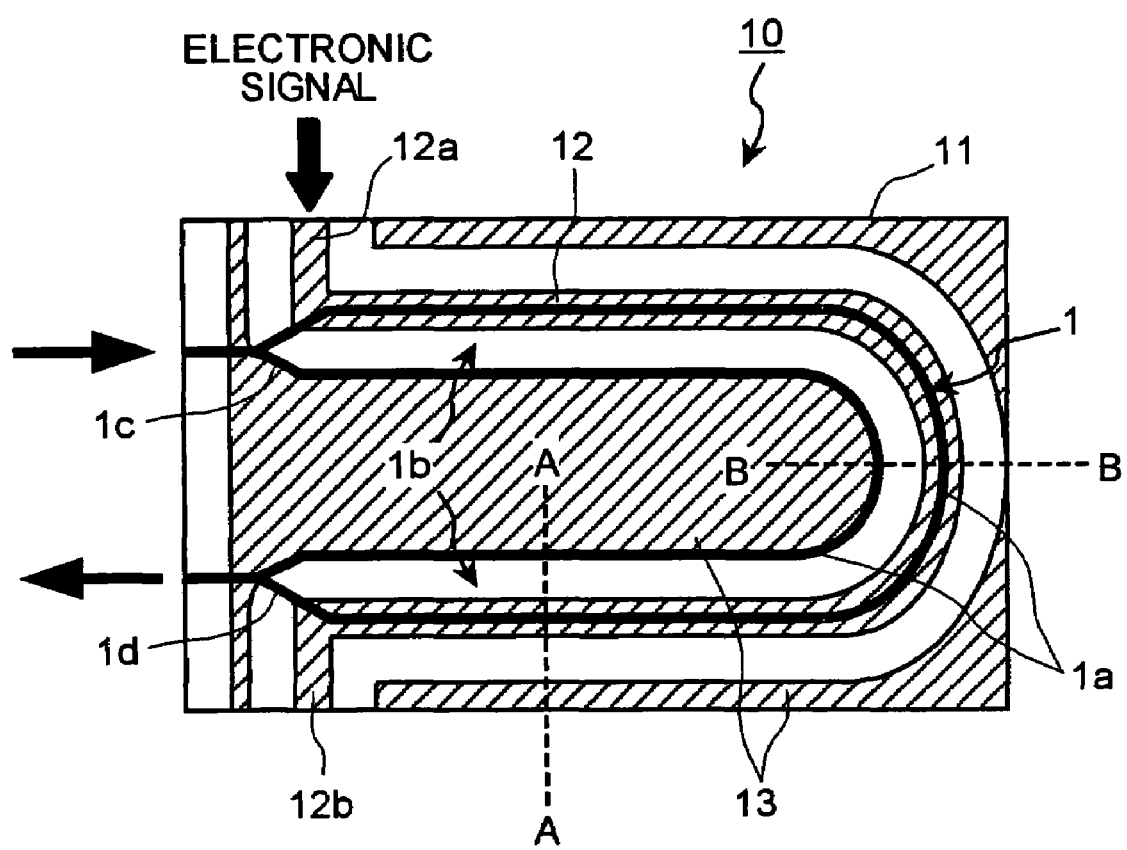
FIG. 13 is a top plan view of an optical modulator according to an optical device of the present invention.

FIG. 13 is a top plan view of an optical modulator as an optical device. This optical modulator has a curved portion at a part of the optical waveguide that is provided in the conventional Mach-Zehnder interference type optical modulator shown in FIG. 16.

On a substrate 11 of an optical modulator 10 shown in FIG. 13, a data line 12, signal electrodes 12a and 12b, and a ground electrode 13 are provided. The data line 12 has a length that satisfies the length of the operation length L0, and has a curved portion that is curved in approximately a U-shape. The optical waveguide 1 is disposed along the data line 12, and branch portions 1c and 1d are formed on a portion that is superimposed with the data line 12. Two optical waveguides are disposed in parallel between these branch portions 1c and 1d. The optical waveguide 1 has the curved portion 1a and the straight line portion 1b in a similar manner to that of the first embodiment. These branch portions 1a and 1b become an interaction section between light and microwave.

Figure 14A:
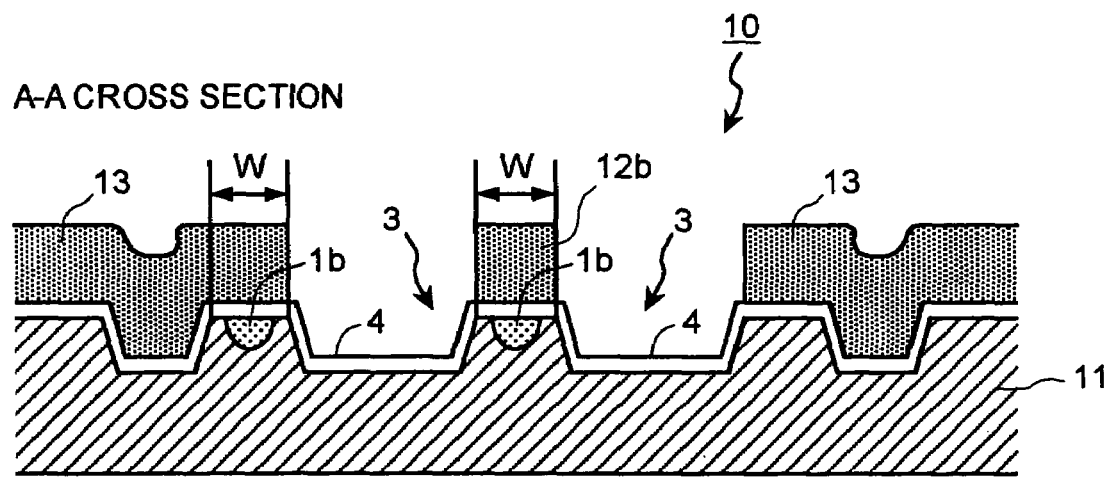
FIGS. 14A and 14B are cross-sectional views of the optical device shown in FIG. 13.
Figure 14B:
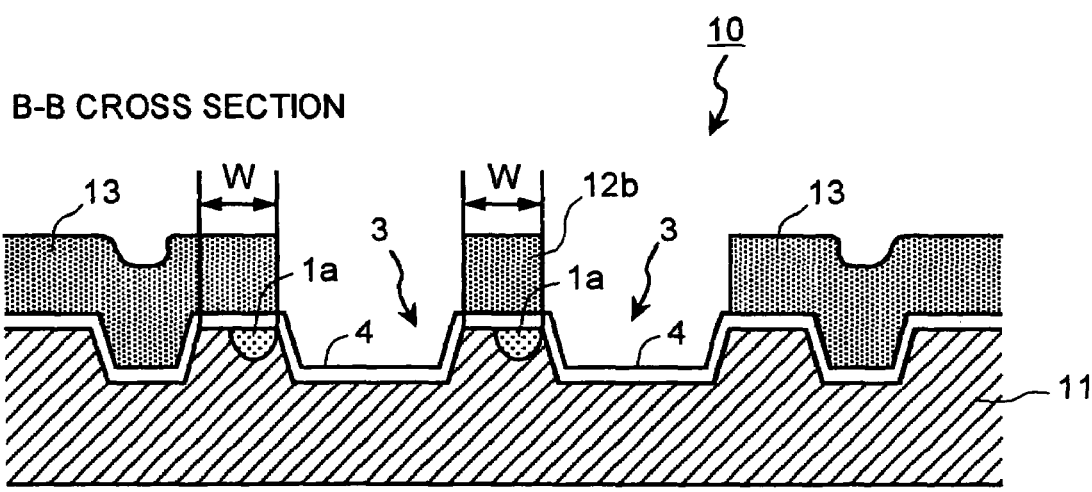

FIGS. 14A and 14B are cross-sectional views of the configuration shown in FIG. 13. As shown in FIGS. 14A and 14B, the ridge structure 3 and the buffer layer 4 are provided over the whole length of the optical waveguide 1. The width W of the ridge structure 3 is constant at the curved portion 1a, thereby to make it possible to align the speed of the microwave with the speed of light over the whole region of the interaction section. As shown in FIG. 14A, the center position of the ridge structure 3 coincides with the center position of the optical waveguide 1, at the portion of the straight line portion 1b of the optical waveguide 1 (cross-section of A—A). Further, as shown in FIG. 14B, the center position of the optical waveguide 1 is disposed with a predetermined shift amount from the center position of the ridge structure 3 to a direction of the external ridge structure 3, at the portion of the curved portion 1a of the optical waveguide 1 (cross-section of B—B). With this arrangement, the radiation loss at the portion of the curved portion 1a can be suppressed. The curved portion 1a of the optical waveguide 1 can also be shifted by a predetermined amount to the internal periphery side of the ridge structure 3 when the radiation loss can be reduced in this direction, in a similar manner to that explained above with reference to FIG. 8.

Figure 16:
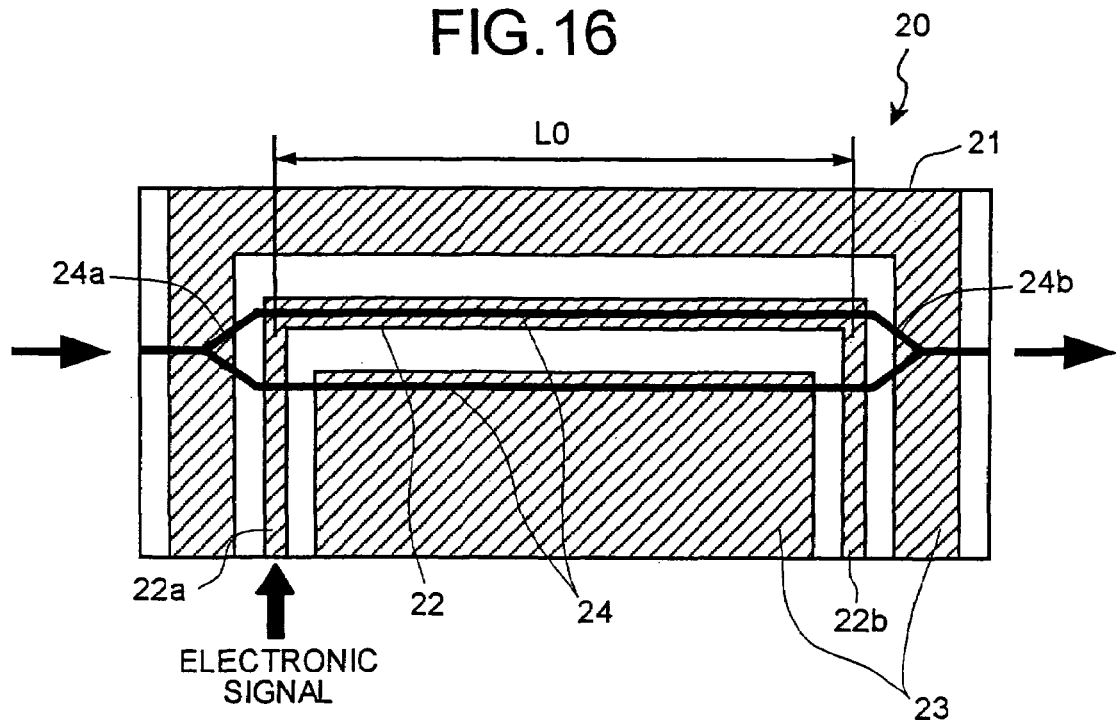
FIG. 16 is a top plan view of a conventional optical modulator.

As explained above, according to the optical modulator 10 explained in the second embodiment, when the optical waveguide 1 is provided on the curved portion 1a that is turned by 180 degrees, the length in the lateral direction can be made shorter than the conventional length shown in FIG. 16, and the device can be made compact.

Figure 15:
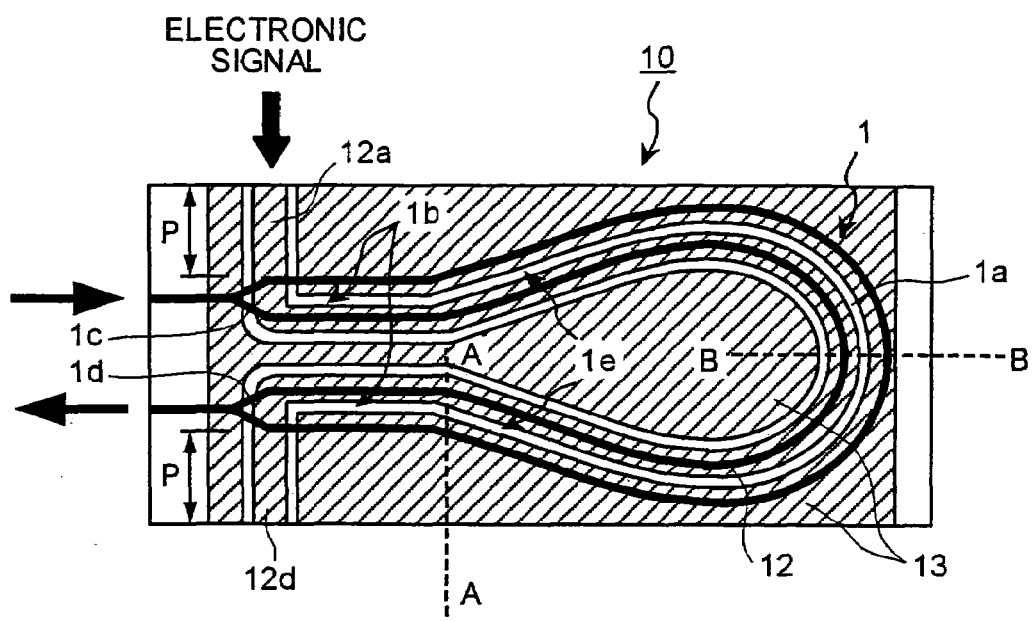
FIG. 15 is a top plan view of another example of the optical modulator.

FIG. 15 is a top plan view of another configuration example of the optical modulator as an optical device. The configuration is different from that shown in FIG. 13 in that the curvature of the curved portion 1a of the optical waveguide 1 is set large. Further, the total width (in the vertical direction in the drawing) is set small. In order to take a large marginal length P to connect a connector at the portions of the signal electrodes 12a and 12b, the straight line portions 1b of the optical waveguide 1 for input and output are set closer to each other. Correspondingly, approximately a half of a part of the straight line portion 1b facing the curved portion 1a side is not linear, and forms an arc portion 1e that connects between the curved portion 1a and the straight line portion 1b.

As explained above, the optical waveguide 1 can be formed freely within a-range of the size of the optical device (substrate 2) to match the size (vertical and lateral sizes) of the optical device and conditions of connector connection and the like. In the configuration shown in FIG. 15, the ridge structure 3 and the buffer layer 4 are also formed along the optical waveguide 1 as shown in FIG. 14. With this arrangement, the optical loss (radiation loss and scattering loss) can be suppressed without depending on the shape of the optical waveguide 1.

The optical waveguide 1 according to the second embodiment is explained taking the example of the configuration of an approximately the U-shape so that the input direction of an optical signal is turned to the output direction of the optical signal by 180 degrees at one position. When one turning is provided at one position of the optical waveguide 1 as shown in FIG. 13 and FIG. 15, the light input section and the output section of the optical waveguide 1 are disposed on the same one side surface of the optical device. The optical waveguide 1 can also have a configuration of approximately an S-shape having a turning at two positions or a turning at three or more positions. When the number of turning of the optical waveguide 1 increases, the work length L0 can be set long, and a variable region of a phase difference can be increased. When the turning is provided by an even number of times, the light input section and the output section of the optical waveguide 1 are disposed on different side surfaces of the optical device.

While a Mach-Zehnder type optical modulator is explained in the second embodiment, the optical waveguide 1 can also be applied to a phase modulator. The configuration of the phase modulator is different from that of the optical modulator only in that one optical waveguide is provided without using branch portions. This phase modulator also has electrodes disposed on the optical waveguide 1. When the curved portion 1a, the ridge structure 3, and the buffer layer 4 described above are provided on the optical waveguide 1 that is provided on the phase modulator, the optical loss can be suppressed and the device can be made compact.

The optical waveguide 1 explained above can also be applied to other electronic device such as an optical switch in addition to the optical modulator such as the phase modulator. The optical loss in the electronic device can also be suppressed, and the device can be made compact.

According to the present invention, a curved portion is formed on an optical waveguide. Even when a curvature of the curved portion is small, there is an effect that optical loss can be suppressed, and that the optical waveguide and an optical device using the-optical waveguide can be made compact.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

Moreover, the entire contents of the prior U.S. patent applications Ser. No. 09/820,634 filed on Mar. 30, 2001 and Ser. No. 09/826,089 filed on Apr. 5, 2001 are incorporated into the application herein by reference.

What is claimed is:

1. An optical waveguide that is formed on a substrate, the optical waveguide comprising:
   a curved ridge structure that is formed by etching the substrate so as to have a curvature in a longitudinal direction of the curved ridge structure;
   a curved optical path that is formed along the curved ridge structure;
   a buffer layer that covers a side of the curved ridge structure and that has a lower refractive index than a refractive index of the substrate;
   a straight optical path that is coupled with the curved optical path;
   a second ridge structure that is formed on the substrate along the straight optical path; and
   a second buffer layer that covers a side of the second ridge structure and that has a lower refractive index than a refractive index of the substrate, wherein
      the straight optical path is formed in and along the second ridge structure, and
      the second ridge structure has a width increased along the straight optical path.

2. An optical waveguide that is formed on a substrate, the optical waveguide comprising:
   a curved ridge structure that is formed by etching the substrate so as to have a curvature in a longitudinal direction of the curved ridge structure;
   a curved optical path that is formed along the curved ridge structure;
   a buffer layer that covers a side of the curved ridge structure and that has a lower refractive index than a refractive index of the substrate; and
   an optical path that is coupled with the curved optical path and that has a width different from a width of the curved optical path, wherein
      the optical path is coupled with the curved optical path so that an axis of the optical path is shifted from an axis of the curved optical path.

3. An optical waveguide that is formed on a substrate, the optical waveguide comprising:
   a curved ridge structure that is formed by etching the substrate so as to have a curvature in a longitudinal direction of the curved ridge structure;
   a curved optical path that is formed along the curved ridge structure;
   a buffer layer that covers a side of the curved ridge structure and that has a lower refractive index than a refractive index of the substrate;
   a straight optical path that is coupled with the curved optical path;
   a second ridge structure that is formed on the substrate along the straight optical path; and
   a second buffer layer that covers a side of the second ridge structure and that has a lower refractive index than a refractive index of the substrate, wherein
      the straight optical path is formed in and along the second ridge structure, and
      the second ridge structure is connected to the curved ridge structure so that an axis of the second ridge structure is shifted from an axis of the curved ridge structure.

4. An optical device for performing phase modulation, comprising:
   an optical waveguide that includes
      a curved ridge structure that is formed by etching a substrate so as to have a curvature in a longitudinal direction of the curved ridge structure,
      a curved optical path that is formed in and along the curved ridge structure,
      a buffer layer that covers a side of the curved ridge structure and that has a lower refractive index than a refractive index of the substrate,
      a second ridge structure that is formed on the substrate straight in a longitudinal direction of the second ridge structure,
      a straight optical path that is coupled with the curved optical path and that is formed in and along the second ridge structure, and
      a second buffer layer that covers a side of the second ridge structure and that has a lower refractive index than a refractive index of the substrate; and
   a signal electrode that is disposed on and along the optical waveguide, wherein
      optical signals transmitted through the curved optical path and the straight optical path interact with electric signals transmitted through the signal electrode, and
      the curved ridge structure and the second ridge structure have a constant width.

5. A method of manufacturing an optical waveguide, comprising:

forming a pattern of titanium on a substrate, the pattern including a curved pattern for forming a curved optical path;

thermally diffusing the pattern at a high temperature;

forming a ridge structure by etching the substrate positioned at a side of the curved pattern, along a shape of the curved pattern; and forming a buffer layer on a side of the ridge structure, the buffer layer being made of a material that has a lower refractive index than a refractive index of the substrate.

6. A method of manufacturing an optical waveguide, comprising:

forming a proton exchange pattern on a substrate by proton exchange, the pattern including a curved pattern for forming a curved optical path;

forming a ridge structure by etching the substrate positioned at a side of the curved pattern, along a shape of the curved pattern; and forming a buffer layer on a side of the ridge structure, the buffer layer being made of a material that has a lower refractive index than a refractive index of the substrate.

* * * * *